Sept. 13, 1966      D. R. JONES      3,272,213
READOUT FOR VORTEX AMPLIFIER
Filed Aug. 13, 1963      3 Sheets-Sheet 1
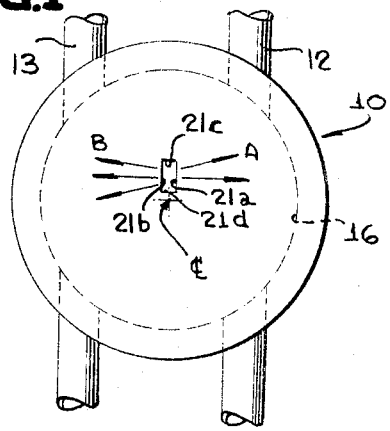
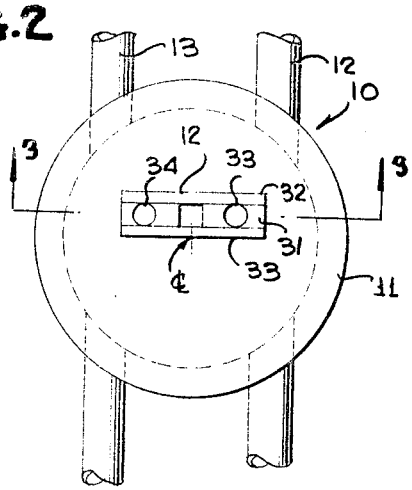
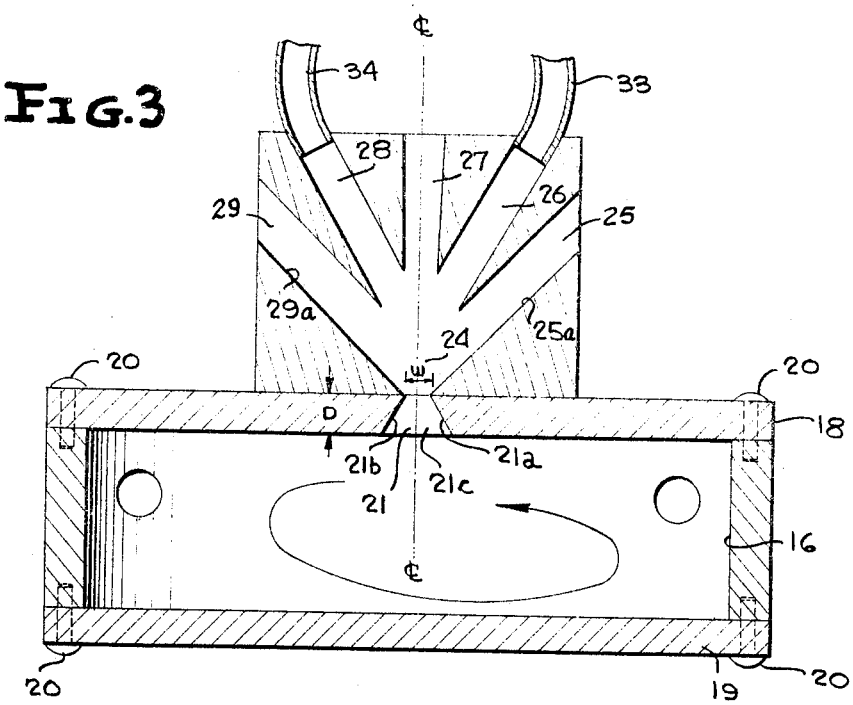
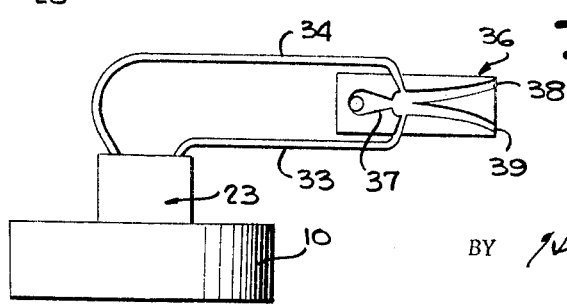
INVENTOR
D. ROLAND JONES
BY *Hurvitz & Rose*
ATTORNEYS Sept. 13, 1966          D. R. JONES          3,272,213
READOUT FOR VORTEX AMPLIFIER
Filed Aug. 13, 1963          3 Sheets-Sheet 2
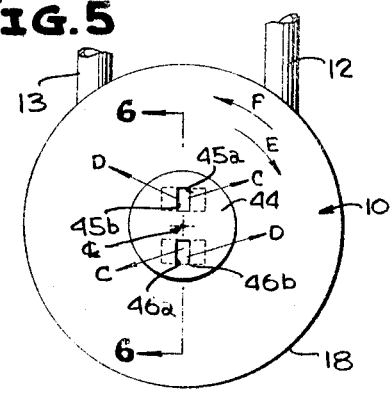
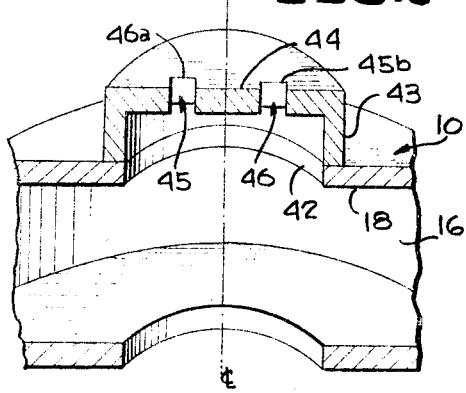
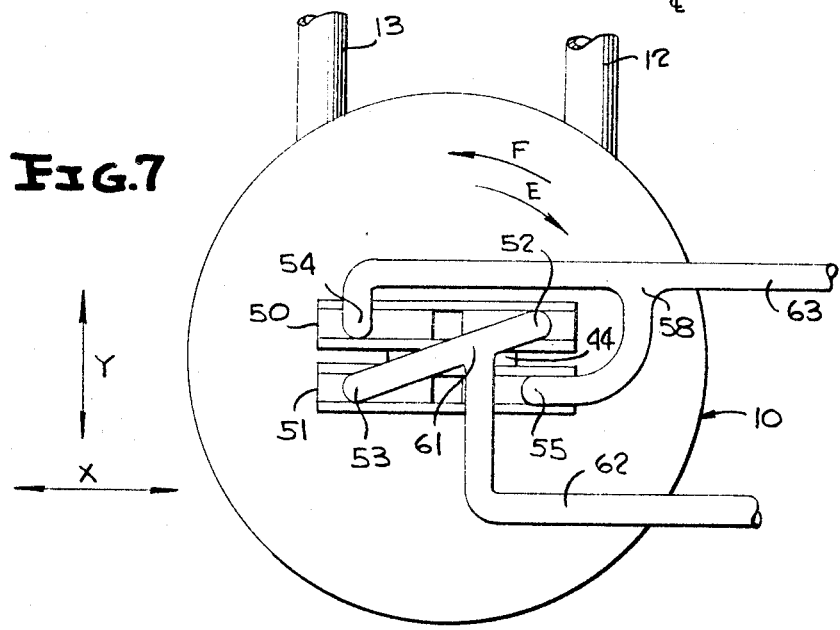
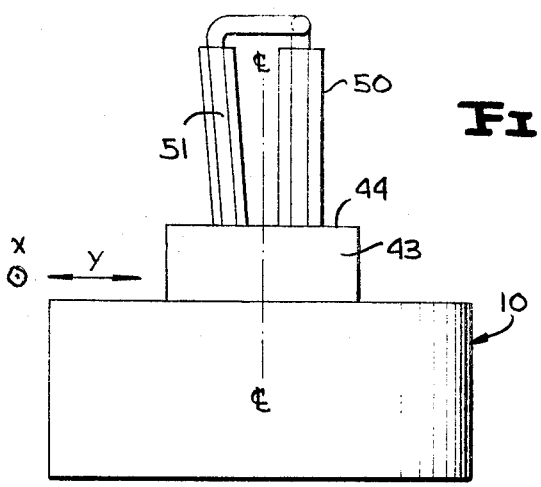
INVENTOR
D. ROLAND JONES
BY *Hurvitz - Rose*
ATTORNEYS Sept. 13, 1966  D. R. JONES  3,272,213
READOUT FOR VORTEX AMPLIFIER
Filed Aug. 13, 1963  3 Sheets-Sheet 3

INVENTOR
D. ROLAND JONES

BY *Hurvitz & Rose*

ATTORNEYS

__United States Patent Office__  3,272,213
Patented Sept. 13, 1966

1

3,272,213
READOUT FOR VORTEX AMPLIFIER
Donnie Roland Jones, Silver Spring, Md., assignor to Bowles Engineering Corporation, Silver Spring, Md., a corporation of Maryland
Filed Aug. 13, 1963, Ser. No. 301,868
10 Claims. (Cl. 137—81.5)

This invention relates generally to pure fluid amplifying systems, and more specifically, to a readout unit for use with a vortex amplifier.

In the pure fluid amplifying art, vortex amplifiers have been developed which will amplify the tangential or circumferential velocity component of a fluid input signal or fluid control signal supplied to the vortex amplifier. As disclosed in Belgian patent, No. 614,978, issued September 12, 1962, to Ronald E. Bowles and Billy M. Horton, a vortex amplifier in its simplest construction comprises a substantially cylindrical chamber and a pair of end plates for enclosing the chamber. An outlet orifice is formed in one of the end plates, the center of the orifice being concentrically located relative to the axis of symmetry of the cylindrical chamber. Since the outlet orifice has a diameter considerably smaller than the diameter of the cylindrical vortex chamber, the circumferential velocity component of rotational flow in the cylindrical chamber is amplified as it exits or egresses from the outlet orifice. Thus, a fluid input or control signal supplied to the cylindrical chamber will have its circumferential velocity component amplified by the vortex amplifier.

If two or more fluid control signals are applied in the same direction to one side of the cylindrical chamber, the direction of the rotating flow in the cylindrical chamber will be dependent upon the relative magnitudes of the fluid input signals, and therefore the direction and magnitude of the rotational flow in the vortex chamber, and the rotational flow which egresses from the outlet orifice, will be a function of the differentials in magnitude between the two or more fluid input signals supplied to the vortex chamber.

It therefore becomes necessary to provide some type of system which will read-out the fluid output egressing from the output orifice of the vortex amplifier to give an indication as to the magnitude and direction of the resultant amplitude of control fluid inputs supplied to the vortex chamber. Since the vortex amplifier requires no mechanical moving parts for the operation thereof, it would be preferable if the readout unit similarly required no mechanical moving parts for its operation. In addition, it would be advantageous from space-saving considerations that the readout unit be able to be directly affixed to the vortex amplifier so that the entire unit comprising the vortex amplifier and the readout unit be compact and of relatively small size.

Broadly, therefore, it is an object of this invention to provide a readout system for use with a vortex-type fluid amplifier requiring no moving mechanical parts for the operation thereof.

More specifically, it is an object of the present invention to provide a pure fluid readout unit which can be attached directly to the outlet orifice of the vortex amplifier to read-out the direction and angular velocity magnitude of the fluid egressing from the outlet orifice.

Another object of this invention is to provide a pure fluid readout unit for reading out the rotational flow from a vortex amplifier, the readout unit being essentially insensitive to forces of acceleration in one plane.

Still another object of this invention is to provide a pure fluid readout unit for converting rotational flow supplied thereto to linear flow output, the magnitude of the linear flow output being a function of the angular velocity and direction of the rotational fluid supplied to the readout unit, the readout unit being essentially insensitive to forces of acceleration in one plane.

Another object of this invention is to provide a pure fluid readout unit for reading out the angular velocity and direction of rotational flow from a fluid vortex amplifier, the unit being attached to the vortex amplifier such that the resulting system is essentially insensitive to forces of acceleration applied in directions essentially parallel to the plane of rotational flow in the vortex amplifier.

According to one embodiment of the present invention, the end plate enclosing one end of the vortex chamber of a vortex amplifier which has been hitherto provided with a concentric outlet orifice for the egress of rotational flow from the cylindrical vortex chamber, is modified by providing a nozzle outlet in the end plate, the axis of symmetry of which being eccentrically positioned relative to the axis of symmetry of the end plate and the vortex chamber. The nozzle outlet is the input nozzle for a pure fluid readout unit which is attached to the end plate and which includes at least a pair of output passages that communicate with the nozzle through a chamber, the chamber receiving the diffused, essentially linear flow resulting from the egress of fluid from the vortex chamber through the nozzle. The readout unit can be considered as essentially an analog or proportional-type fluid amplifier with the conventional control nozzles removed or blocked. The rotational flow in the vortex chamber is converted by the readout unit to substantially linear flow and the proportion of linear flow egressing from the output passages of the readout unit is a function of the angular velocity and direction of the rotational flow in the vortex amplifier.

Another embodiment of the instant invention contemplates the use of plural pure fluid readout units which are attached to the end plate of the vortex amplifier off-center with respect to the axis of symmetry of the vortex chamber. The output passages of the two units are intercoupled in such a way that the magnitude of the output signal issuing from the combined unit is essentially twice that which would be produced by a single unit, and the entire system is essentially insensitive to forces of acceleration applied substantially parallel to the plane of the end plate or to the plane of the rotational flow in the vortex chamber.

The above and still further objects, features and advantages of the present invention will become apparent upon consideration of the following detailed description of several specific embodiments thereof, especially when taken in conjunction with the accompanying drawings, wherein:

FIGURE 1 is a plan view of the vortex amplifier with a pure fluid readout unit removed from the end plate;

FIGURE 2 is a plan view of a pure fluid readout unit attached to the end plate of a vortex amplifier;

FIGURE 3 is a sectional side view taken along section lines 3—3 of FIGURE 2;

FIGURE 4 illustrates a pure fluid amplifier under the control of a pure fluid readout unit attached to a vortex amplifier;

FIGURE 5 is a plan view of the vortex amplifier which has been modified by providing an outlet chamber extending from the end plate that encloses one end of the vortex chamber of the amplifier;

FIGURE 6 is a sectional side view taken along section line 6—6 of FIGURE 5;

FIGURE 7 is a plan view of a vortex amplifier having a pair of pure fluid readout units affixed to the end plate enclosing the vortex chamber of the amplifier, the output passages of the pure fluid readout units being intercoupled so that the resulting system is substantially insensitive to forces of acceleration applied substantially parallel to the horizontal plane of the end plate;

FIGURE 8 is an end view of the system shown in FIGURE 7;

Figure 10:
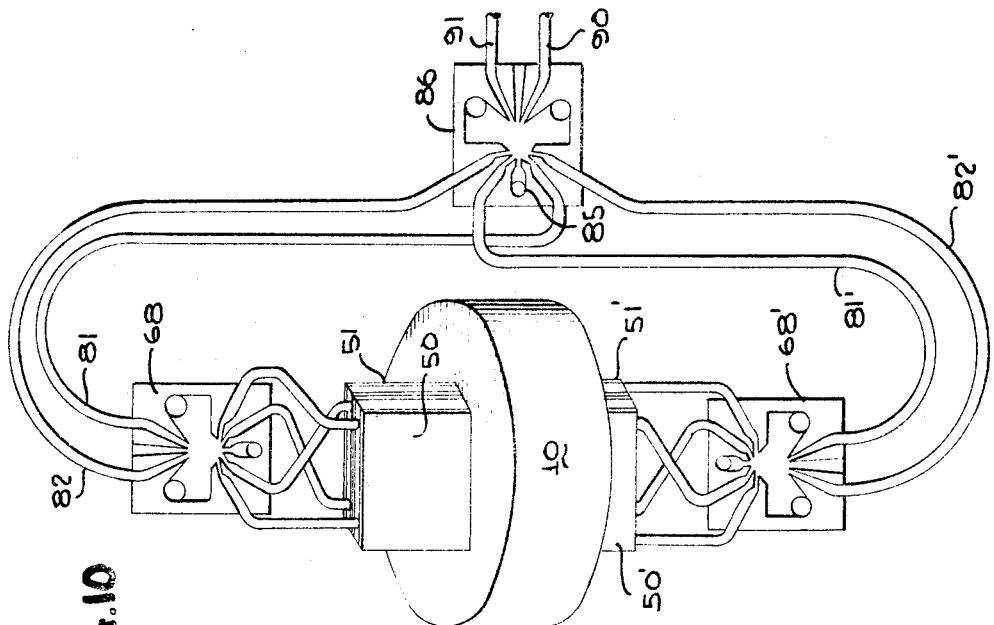
FIGURE 10 illustrates two pairs of readout units connected to receive rotating fluid output signals issuing from both ends of a vortex amplifier, the readout units supplying fluid input signals to a pure fluid summing amplifier.

Referring now to FIGURES 1 and 3 of the accompanying drawings for a more complete understanding of the invention, there is shown a vortex amplifier 10. For the purposes of illustrating the principles of this invention, the amplifier 10 may be any conventional vortex amplifier, such as disclosed in the aforementioned Belgian Patent No. 614,978, or the amplifier 10 may be a differential-type of vortex amplifier such as disclosed in a copending U.S. application Serial No. 226,856, filed September 28, 1962, by Francis M. Manion. For the purposes of describing the instant invention, the vortex amplifier 10 is shown to be a differential-type of vortex amplifier wherein two tubes 12 and 13 are positioned to issue opposing control fluid input signals into the substantially cylindrical vortex chamber 16, the tubes 12 and 13 receiving control fluid signals from a source (not shown).

Referring to FIGURE 3 in particular, it can be seen that the vortex chamber 16 is enclosed by flat, circular end plates 18 and 19 which may be attached to the edges of the chamber 16 by machine screws 20, by adhesives, or by any other suitable connecting means. A nozzle-shaped configuration is formed in the end plate 18 to provide an outlet nozzle 21 through which fluid can egress from the vortex chamber 16. The nozzle 21 is formed by converging walls 21a and 21b as shown in FIGURE 3 and by parallel walls 21c and 21d, the latter walls being substantially perpendicular to the inclined planes formed by the converging side walls 21a and 21b. The downstream or discharge end of the nozzle 21 is shown to be of rectangular shape in FIGURE 1. The sidewalls 21a and 21b are disposed essentially parallel to a line drawn radially from the axis of symmetry of the vortex amplifier 10, the axis of symmetry being designated by centerline CL in FIGURE 3, and the geometrical center of the rectangular orifice of the nozzle 21 is located a relatively short distance from the axis of symmetry of the vortex chamber 16. The nozzle 21 also serves as the input nozzle for a pure fluid readout unit 23 which is attached to the end plate 18 of the amplifier 10 by machine screws, adhesives, or by any other suitable means (not shown).

The readout unit 23 comprises a fluid receiving chamber 24 positioned to receive fluid egressing from the nozzle 21, and five passages designated by the numerals 25, 26, 27, 28 and 29 are positioned to receive fluid from the downstream end of the chamber 24. The passages 25, 26, 27, 28 and 29 inclusive, are formed in a central plate 31 which is positioned and sealed between a pair of end plates 32 and 33, the end plates 32 and 33 being affixed to the center plate 31 by adhesives, machine screws, or any other suitable means. The readout unit 23 basically is a pure fluid amplifier of the proportional type with the control nozzles removed or blocked off, and the walls of the passages 25 and 29 are set back sufficiently remotely from the orifice of the nozzle 21 so that there is no tendency for the fluid egressing from the nozzle 21 to lock onto either wall forming the passages 25 and 29. In addition, the passages 25 and 29 discharge fluid to atmosphere or to an ambient pressure environment so that pressures along the sidewalls 25a and 29a are equalized and reduced to substantially atmospheric pressure values.

As mentioned hereinabove, the center of the orifice formed by the sidewalls 21a and 21b, and by end walls 21c and 21d of the nozzle 21 is located in the end plate 18 non-concentrically with respect to the axis of symmetry CL of the vortex chamber 16 and the plate 18, the sidewalls 21a and 21b being essentially parallel to a radial line which can be drawn from the axis of symmetry CL of the end plate 18.

Since the direction and angular velocity of the fluid rotating in the vortex chamber 16 will be a function of the resultant magnitude of the fluid signals egressing from the input tubes 12 and 13, if the center of the orifice of the nozzle 21 were located concentric with the axis of symmetry CL of the vortex chamber 16, the flow from the nozzle would be essentially rotational, as will be evident, since the center of rotational flow in the chamber 16 would be concentric with respect to the center of the nozzle orifice. However, by positioning the nozzle 21 as shown in FIGURE 1 and assuming that the fluid flow in the vortex chamber 16 is in a clockwise sense of rotation as viewed in FIGURE 1, rotating fluid will impinge against the sidewall 21a and be directed by the inclination of the sidewall 21b to egress from the nozzle 12 as a diffused, but substantially linear stream. The vectors A indicate the general direction of flow from the nozzle 21. The angles θ defined between the horizontal plane of the end plate 18 and the vectors A will ordinarily and preferably be acute angles.

Conversely, when the vortical flow in the chamber 16 is rotating in a counterclockwise sense, the fluid will impinge against the sidewall 21b of the nozzle 21 and be directed by the inclination of the sidewall 21a to egress from the nozzle 21 in a direction indicated by the vectors B at acute angles θ', the angles θ' being defined by the direction of the vectors B and the horizontal plane of the plate 18. The direction of egress of fluid from the nozzle 21 will thusly be determined by the direction of rotation of fluid in the vortex chamber 16.

In addition, since the size of the orifice formed by the nozzle 21 is considerably less than the diameter of the vortex chamber 16 and since the nozzle 21 is positioned but a short distance from the axis of symmetry CL of the vortex chamber 16, the circumferential component of rotational flow from the chamber 16 is velocity amplified as it issues from the nozzle 21. Thus, it can be seen from FIGURE 2 of the drawings that the output tube 34 of the unit 23 will receive the greatest proportion, or all, of the essentially linear fluid stream issuing from the nozzle 21 when the flow in the chamber 16 is counterclockwise in sense of rotation. Conversely, the output tube 33 will receive a greater proportion, or all, of the essentially linear fluid stream egressing from the nozzle 21 when the flow in the vortex chamber 16 is rotational in a clockwise sense.

The quantity of fluid received by the output tube 34 will depend primarily upon the amount the fluid stream diffuses as it leaves the nozzle orifice. The degree or amount of stream diffusion is a function of the angular velocity of rotation imparted to the fluid in the chamber 16 as well as the size of the nozzle orifice, as will be discussed in greater detail subsequently.

With reference to FIGURE 3, it can be seen that as the fluid egresses from the nozzle 21 it tends to fan out or diffuse in the chamber 24 and enter the various passages that communicate with that chamber. The width of plate 18 governs the length of the nozzle 21 and this length is somewhat critical since, if the nozzle is too long with respect to the width of the orifice, the fluid stream issuing from the nozzle orifice will not adequately diffuse or fan out, and consequently, the flow pattern in the chamber 24 will be essentially that of a constricted stream of fluid which will flow only into the output passage 27 if that passage is positioned in susbtantial alignment with the nozzle 21. Under these conditions, the output tubes 33 and 34 would receive little, if any, fluid from the nozzle 21. An opposite extreme condition will occur if the length of the nozzle 21 is very short relative to its width so that the fluid stream issuing from the nozzle 21 sprays into the chamber 24 diverging from the nozzle orifice at substantial angles with respect to the axis of symmetry of the chamber 24. As a result, a low amplitude fluid output signal would egress from the output tubes 33 and 34 and there would be little, if any, differential in pressure or flow between the tubes 33 and 34. Under these conditions, the fluid outputs from the tubes 33 and 34 would not provide a proper indication as to the angular velocity or direction of fluid flow in the chamber 16.

Therefore, a proper relationship between the length and width of the nozzle 21 should preferably be maintained to provide the desired diffusion or fanning-out of the stream in the chamber 24. The deflection of the jet issuing from the nozzle 21 is governed by the axial and tangential components of velocity of the rotational flow in the vortex chamber. The axial velocity component depends upon the velocity of axial flow through the vortex amplifier which in turn is determined by the pressure of the fluid supplied to the amplifier. The tangential velocity component, as mentioned hereinabove, is determined by the ratio of the radii of the vortex chamber and the nozzle 21. The range of input fluid signals may be controlled by varying the pressure of fluid supplied to the vortex amplifier.

For most applications, the optimum flow pattern in the chamber 24 should be sufficiently constructed so that, for a predetermined minimum angular velocity of rotation in one direction in the vortex chamber 16, the output passage 28 will receive substantially all the fluid egressing from the nozzle 21, any fringe portions of flow resulting from diffusion entering the passages 27 and 29, and egressing from the unit 23 without producing a fluid signal in the passage 26. Conversely, for predetermined minimum angular velocities of rotational flow in an opposite direction, the output passage 26 should receive substantially all of the flow egressing from the nozzle 21, any fringe portions resulting from diffusion being received by the passages 25 and 27, respectively, and egressing from the unit 23 without entering the passage 28.

For an essentially linear type of flow pattern in the chamber 24 with optimum diffusion as described hereinabove, for considerable ranges of rotational flow velocity the depth D, FIGURE 3, of the nozzle orifice has been found to be approximately one to one and one-half times the width W, with the entrances to the output passages located six to ten times the width of an output passage downstream of the nozzle orifice. However, those skilled in the art will be able to properly design the nozzle 21 and the output passages 26, 27 and 28 so that for a given range of angular velocity of rotational flow in the chamber 16, the diffusion of fluid in the chamber 24 needed to provide a given differential output fluid signal in the output passages will be produced.

The unit 23 may be of the boundary layer type wherein the passages 25 and 29 are dispensed with and the chamber 24 is provided with inclined sidewalls connecting the passages 26 and 28 to the sidewalls 21a and 21b, respectively, so that boundary layer effects are created along those sidewalls so that fluid flow against one sidewall or the other will lock onto that sidewall and egress from the corresponding output passage of the readout unit 23. In this type of system, the passage 27 could be dispensed with since all of the fluid will enter either the output passage 26 or 27, depending upon the direction of rotational fluid flow in the chamber 16.

As shown in FIGURE 4, the output tubes 33 and 34 may be connected to control nozzles of another pure fluid amplifier, designated by the numeral 36, to control the displacement of the power steam issuing from the power nozzle 37 into the output passages 38 or 39. The output passages 38 and 39 may be connected to successively staged amplifiers or to a unit utilizing fluid for the operation or control thereof and gives a visual indication as to the magnitude and direction of the resulting vortical flow in the vortex amplifier 10. The amplifier 36 may either be an analog type of pure fluid amplifier wherein the displacement of the power stream in the interaction chamber of the amplifier 36 is proportional to the fluid control signal supplied thereto, or the amplifier 36 may be designed to utilize boundary layer effects so that the power stream will flip between the output passages 38 and 39 in response to the control signal received by the amplifier 36 from the readout unit 23.

FIGURES 5 and 6 of the accompanying drawings illustrate a modification of a vortex amplifier 10 constructed in accordance with the principles of this invention. In this embodiment, the end plate 18 is provided with a circular orifice 42 for permitting fluid flow from the vortex chamber 16 into an output chamber 43, the diameter of the chamber 43 being considerably less than the diameter of the vortex chamber 16 so that the circumferential velocity component of rotational flow is velocity amplified as fluid enters the chamber 43. A flat, circular plate 44 covers the downstream end of the chamber 43, the plate 44 being provided with at least one outlet nozzle, two outlet nozzles being shown and designated by the numerals 45 and 46. It is to be understood, however, that either one of the outlet nozzles 45 or 46 may be used by itself as a constricted egress orifice for fluid egressing from the cylindrical chamber 43. Referring now to FIGURE 5, since the diameter of the chamber 43 is considerably less than that of the chamber 16, the tangential velocity component of clockwise rotational flow in the chamber 16, indicated by the arrow E, is velocity amplified and flows against the sidewalls 45a and 46a of the nozzles 45 and 46, respectively. These flows are directed by the inclination of the sidewalls 45b and 46b from the plate 44, as indicated by the arrows C, to issue from the nozzles 45 and 46 as essentially linear streams. When the flow is counterclockwise in the chamber 16, as indicated by the arrow F, FIGURE 5, the counterclockwise rotational flow in the chamber 44 will be directed by the sidewalls forming the nozzles 45 and 46 to issue as essentially linear streams from the chamber 43 in directions indicated generally by the arrows D.

The diffusion of the streams egressing from the nozzles 45 and 46 will be a function of the angular velocity of the fluid rotating in the chamber 43 and also a function of nozzle design. As discussed hereinabove in relation to the design of the nozzle 21, the depth of the nozzle can be related to its width to produce the desired diffusion pattern for given ranges of angular velocity of rotational flow in the chamber 16. The angles formed by the arrows C and D and the horizontal plane of the end plate 44 are generally acute angles depending upon nozzle design and the angular velocity of fluid in the chamber 43.

Referring now to FIGURES 7 and 8, a pair of pure fluid readout units 50 and 51 are secured by machine screws, adhesives, or any other suitable means, perpendicularly to the horizontal plane of the plate 44 and are positioned to receive fluid from the nozzles 45 and 46, respectively. The units 50 and 51 are constructed essentially identically to the unit 23, FIGURES 2 and 3, and are respectively provided with output tubes 52, 54 and 53, 55, similar to the output tubes 33, 34 of the unit 23. The units 50 and 51 are positioned parallel to the planes of the end walls of the nozzles 45 and 46, respectively, so that the output tubes 52 and 53 receive all, or substantially all, of the fluid egressing from the nozzles 45 and 46 in directions indicated by the arrows C, and the tubes 54 and 55 receive all, or substantially all, of the fluid when the nozzles 45 and 46 discharge fluid in directions indicated by the arrows D. As will be evident to those working in the art, the proportion of fluid received by the output tubes of each readout unit will depend upon the diffusion pattern of the stream issuing from the nozzles of the output chamber 43.

The output tubes 52 and 53 are connected by a junction 61 to a single output tube 62 and the output tubes 54 and 55 are connected by a junction 58 to a single output tube 63. Thus, the fluid output signals egressing from the tubes 62 and 63 are respectively the sums of the fluid signals received by the tubes 52, 53 and by the tubes 54, 55. The pressure or flow differentials which exist between the tubes 62 and 63 are therefore functions of the direction and angular velocity of rotational flow in the chamber 43.

The gain of a vortex amplifier increases as the difference between the diameter of the vortex chamber and the outlet chamber increase and as the distances between the centers of the nozzle orifices and the axis of symmetry CL decrease. Accordingly, for maximum gain the readout units 50 and 51 should be located as close as practical beside each other. It will be evident to those working in the art that the number of nozzles formed in the end plate 44 will ordinarily be a matter of choice and that the nozzles are shown having rectangular orifices because the readout units that receive fluid from the nozzle orifices are of rectangular construction. The nozzles may also be round, oval, or any other desired shape as long as the chamber of the readout unit is designed to receive fluid from the nozzle without excessive leakage occurring between the nozzle orifice and the chamber.

The readout system illustrated in FIGURES 7 and 8 of the drawings is essentially insensitive to forces of acceleration applied in directions parallel to those indicated by the letters X and Y. For the purpose of illustrating this feature of the invention, assume that flow is clockwise as indicated by the letter E, so that the fluid is egressing from the nozzles 45 and 46 in the directions of the vectors C in FIGURE 5, so that the output tubes 52 and 53 are receiving all, or substantially all, of this fluid, and the output tubes 54 and 55 are receiving little or no fluid.

If forces of acceleration are applied to the system in a direction from left to right, as viewed in FIGURE 7, parallel to the arrow designated by the letter X; less fluid will egress from the nozzle 45, FIGURE 5, in the direction indicated by the letter C, but an equal and oppositely directed amount of fluid will issue from the nozzle 46 in the direction of arrow C. Hence, there will be an equalization of pressure and flow in the junction 61 which joins the nozzles 45 and 46 by equal and oppositely directed flows from the nozzles 45 and 46. The fluid, if any, flowing into the output tubes 54 and 55 will be equalized during acceleration of the system for the same reason; that is, there may be a greater flow of fluid in the direction of arrow D, FIGURE 5, from the nozzle 45, but there will be an equal and opposite reduction in flow in the direction of arrow D from the nozzle 46. Thus, the flow and pressure of the fluid received by the tube 63 after acceleration of the system will be the same as before acceleration, and therefore differentials between the output tubes 62 and 63 will be maintained constant during acceleration of the system.

Forces of acceleration applied in the Y directions parallel to the horizontal plane of the plate 44 will also not affect the differentials existing between the tubes 62 and 63, as will be evident.

Figure 9:
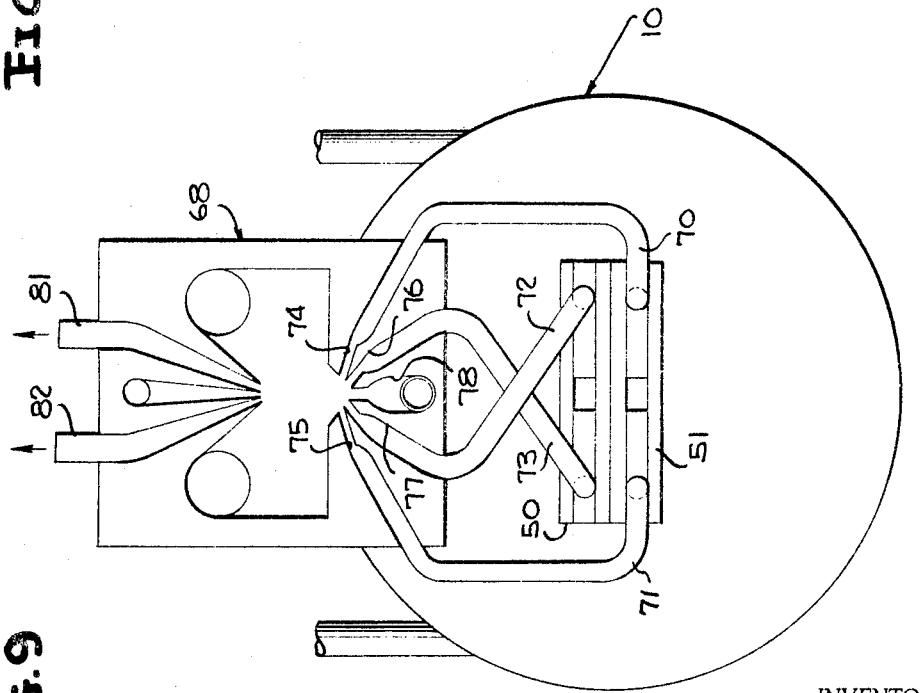
FIGURE 9 illustrates the coupling of the outputs from a pair of readout units to the control nozzles of a pure fluid amplifier.

FIGURE 9 illustrates the coupling of a pair of readout units 50, 51 to a conventional analog type of pure fluid amplifier, referred to generally by the numeral 68. As shown in FIGURE 9, output tubes 70 and 71 receive linear fluid streams from the readout unit 51 and output tubes 72 and 73 receive linear fluid streams from the readout unit 50; the tubes 70, 71, 72 and 73 being coupled to control nozzles 74, 75, 77 and 76, respectively, of the amplifier 68. Fluid jets egressing from the control nozzles 74 and 76 displace the power stream issuing from the power nozzle 78 into an output tube 82 whereas fluid jets egressing from the control nozzles 75 and 77 displace the power stream into an output tube 81. The output tube 81 receives fluid as a result of the tubes 71 and 72 receiving a greater quantity of fluid than the tubes 70 and 73, and the output tube 82 receives fluid when the output tubes 70 and 73 receive greater quantities of fluid than the tubes 71 and 72.

FIGURE 10 illustrates a system wherein two pairs of readout units 50, 51; 50′, 51′ receive fluid input signals from nozzles, such as the nozzle 21, FIGURES 1 and 3, formed in opposite end plates of the vortex amplifier 10 so that the rotational fluid signals egressing from both ends of the amplifier 10 are received and converted to linear signals by the nozzles and the two pairs of readout units. The fluid output signals from the readout units are supplied to pure fluid amplifiers 68 and 68′, and the output tubes 81, 82 and 81′, 82′ of the readout units 68 and 68′, respectively, are connected to the control nozzles of a pure fluid amplifier 86. The coupling between the pairs of readout units and the amplifier 86 is as shown in FIGURE 10 so that the fluid output signals from the readout units corresponding to the direction and magnitude of rotational flow in the vortex amplifier 10 are amplified by the amplifiers 68 and 68′ and applied as control signals in the summing amplifier 86 to displace the power stream issuing from a power nozzle 85 to produce a fluid output signal in output tubes 90 and 91 which is the sum of the signals received by each readout unit. The fluid signals issuing from the tubes 90 and 91 may be utilized to operate or control the operation of other fluid systems, as will be apparent to those working in the art.

While I have described and illustrated several specific embodiments of my invention, it will be clear that variations of the details of construction which are specifically illustrated and described may be resorted to without departing from the true spirit and scope of the invention as defined in the appended claims.

What I claim is:

1. In combination, a vortex amplifier having a cylindrical chamber defined by at least one end wall, said end wall having at least one orifice located adjacent to and offset from the center of said wall along a radius thereof, the radial length of said orifice being substantially less than the radius of said end wall, said orifice arranged to issue a stream of fluid into a plane generally perpendicular to said end wall and said radius and deflectable in said plane as a function of the direction and rate of rotation of the fluid in said vortex amplifier, and a pair of passages located in said plane and downstream of said orifice for receiving the stream of fluid issued by said orifice, said passages located on opposite sides of the axis of said orifice and diverging downstream and outwardly therefrom at acute angles relative thereto.

2. The combination as claimed in claim 1 wherein the orifice formed in said end wall is of substantially rectangular shape.

3. The combination acocrding to claim 1 wherein said passages are located a distance downstream of said orifice equal to approximately at least six times the width of said orifice in said plane.

4. The combination according to claim 1 wherein the axial length of said orifice is approximately equal to one and one-half times the width thereof in said plane.

5. In combination a vortex amplifier having a cylindrical chamber defined by at least one end wall, said end wall having at least one orifice located adjacent to and offset from the center of said wall along a radius thereof, the radial length of said orifice being substantially less than the radius of said end wall, said orifice arranged to issue a stream of fluid into a plane generally perpendicular to said end wall and said radius and deflectable in said plane as a function of the direction and rate of rotation of the fluid in said vortex amplifier, and a pair of passages located in said plane and downstream of said orifice for receiving the stream of fluid issued by said orifice, at least one of said passages being located adjacent the axis of said orifice and diverging downstream and outwardly therefrom at an acute angle relative thereto.

6. In combination a vortex amplifier having a cylindrical chamber defined by at least one end wall, said end wall having at least one orifice located adjacent to and offset from the center of said wall along a radius thereof, the radial length of said orifice being substantially less than the radius of said end wall, said orifice arranged to issue a stream of fluid into a plane generally perpendicular to said end wall and said radius and deflectable in said plane as a function of the direction and rate of rotation of the fluid in said vortex amplifier, and a pair of passages located in said plane and downstream of said orifice for receiving the stream of fluid issued by said orifice, said passages located on opposite sides of the axis of said orifice and diverging downstream and outwardly therefrom at acute angles relative thereto and means for confining the stream of fluid to said plane.

7. The combination according to claim 6 comprising a third passage located in said plane and downstream of said orifice, said third passage being symmetrical with respect to the axis of said orifice.

8. In combination a vortex chamber defined by at least one circular end wall lying parallel to the plane of flow of fluid from the peripheral edge of said end wall toward the center thereof, a pair of orifices formed in said end wall and lying on opposite sides of and adjacent the center of said chamber, each of said orifices lying along a radius of said chamber and having a dimension along said radius substantially smaller than the radius of said chamber, each said orifice issuing a stream of fluid deflectable in a second plane perpendicular to said first-mentioned plane, a pair of readout devices each associated with a different one of said orifices, each said readout device comprising a pair of passages located in said second plane and downstream of its associated orifice for receiving the stream of fluid issued thereby, said passages being located on opposite sides of the axis of their associated orifice and diverging outwardly and downstream therefrom at an acute angle relative thereto.

9. The combination according to claim 8 wherein one passage of each of said readout devices receives a greater proportion of the fluid stream than the other of said passages upon rotation of fluid in one direction in said vortex chamber, means for summing the fluid signals developed in each said one passage and means for summing the fluid signals developed in each said other passages of said readout devices.

10. In combination, a vortex chamber defined by at least one circular end wall lying parallel to the plane of flow of fluid from the peripheral edge of said end wall toward the center thereof, a pair of orifices formed in said end wall and lying on opposite sides of and adjacent the center of said chamber, each of said orifices lying along a radius of said chamber and having a dimension along said radius substantially smaller than the radius of said chamber, each of said orifices issuing a stream of fluid deflectable in a second plane perpendicular to said first-mentioned plane, a pair of readout devices each associated with a different one of said orifices, each said readout device comprising a pair of passages located in said second plane and downstream of its associated orifice for receiving the stream of fluid issued thereby, at least one of said passages being located adjacent the axis of said orifice and diverging downstream and outwardly therefrom at an acute angle relative thereto.

References Cited by the Examiner

UNITED STATES PATENTS 3,075,227   1/1963   Bowles _____ 137—81.5

FOREIGN PATENTS 1,318,907   1/1963   France.

M. CARY NELSON, *Primary Examiner.*

LAVERNE D. GEIGER, *Examiner.*

W. R. CLINE, *Assistant Examiner.*